United States Patent

[11] 3,558,117

| [72] | Inventor | Walter Hess<br>Dusseldorf, Germany |
|---|---|---|
| [21] | Appl. No. | 780,803 |
| [22] | Filed | Dec. 3, 1968 |
| [45] | Patented | Jan. 26, 1971 |
| [73] | Assignee | Schloemann Aktiengesellschaft<br>Dusseldorf, Germany<br>a company of Germany |
| [32] | Priority | Dec. 27, 1967 |
| [33] | | Germany |
| [31] | | 1,627,625 |

[54] GAS CUTTING DEVICE FOR SEVERING HORIZONTALLY DELIVERED MATERIAL
9 Claims, 4 Drawing Figs.

| [52] | U.S. Cl. | 266/23 |
|---|---|---|
| [51] | Int. Cl. | B23k 7/10 |
| [50] | Field of Search | 266/23;<br>148/9 |

[56] References Cited
UNITED STATES PATENTS

| 3,403,896 | 10/1968 | Mortellito et al. | 266/23 |
|---|---|---|---|
| 3,462,134 | 8/1969 | Michelson | 266/23 |
| 3,497,195 | 2/1970 | Kalkhof | 266/23 |

*Primary Examiner*—Frank T. Yost
*Attorney*—Holman & Stern

ABSTRACT: A gas cutting device for severing horizontally delivered material, comprising a longitudinal carriage travelling with the material to be cut, and a transverse carriage carrying clamping means and cutting burners, the transverse carriage being supported by bearing balls, the lower ball races of which are mounted upon transverse members extending over the track width of the longitudinal carriage, and the upper ball races being arranged on the transverse carriage, and at least either the upper ball races or the lower ball races being plane and comparatively broad.

PATENTED JAN 26 1971

INVENTOR.
WALTER HESS

BY Glascock, Downing &
Seebold
ATTORNEYS

PATENTED JAN 26 1971 3,558,117

INVENTOR.
WALTER HESS

BY Glascock, Downing &
Seebold
ATTORNEYS

GAS CUTTING DEVICE FOR SEVERING HORIZONTALLY DELIVERED MATERIAL

This invention relates to a gas cutting (or oxyacetylene cutting) device for severing horizontally delivered strand material. It consists of a longitudinal carriage capable of travelling with the speed of delivery of the strand material to be divided, in the direction of motion thereof, and of a connection, extending transversely to the direction of the strand, in which clamping levers are supported and burners are guided.

Known gas cutting devices of this nature are employed, particularly for severing slabs. The slabs issuing from the guides of continuous casting plant in many cases however do not lie exactly midway upon the roller table, so that it gives rise to considerable difficulties in obtaining a reliable clamping action of the clamping jaws which, however is indispensable both for the clean execution of the severing cut and for the smooth running of the gas cutting device as a whole.

The object of this invention is to provide a gas cutting device of the kind hereinbefore described, in which, independently of the position of the strand of material upon the roller table or upon a supporting-roller chain, a reliable engagement of the clamping jaws is ensured, so that with undisturbed operation a satisfactory severing cut is rendered possible. This is substantially obtained in accordance with the invention by the fact that the connection carrying the clamping-jaw bearing and the burners is constructed as a transverse carriage, which in particular is supported upon bearing balls, the lower race surfaces of which are arranged upon crossbars extending over the track width of the carriage, whilst its upper races are arranged on the transverse carriage, at least the upper or the lower races being plane and comparatively broad. With such a transverse carriage one can always establish either by hand, or, as hereinafter indicated, according to an especially advantageous form of construction of the invention, by means of the clamping jaws themselves, a position which corresponds exactly to the particular eccentric position for example of a slab. In addition to this the proposed supporting the balls enables the transverse carriage also to adjust itself obliquely to the requisite extent. This extent is given by the strand material occasionally not issuing parallel to the longitudinal direction of the conveying device. Accordingly the clamping jaws always grip at positions exactly opposite to one another on the strand material, and thus render possible not only the shortest severing cut, but also the most reliable clamping position, by always locating a burning cut at right angles to the longitudinal axis of the slab.

In order to ensure a satisfactory method of working of the ball bearing, each of the balls, according to the invention, is guided in a cage which is displaceable in the direction of movement between its upper and lower races. It is particularly advantageous to make the upper race wider than the lower one, and to make both the races plane, each ball cage consisting of a bar which is provided with a bore corresponding in diameter to the ball, and which is displaceable on blocks or pedestals arranged at both ends of the corresponding transverse race, and is guided by sidewalls. Each of the guiding ledges here need be only half as large as the entire displacement path. In order to protect the balls against contamination and against mechanical injuries, there is arranged, above the said bore of the guiding bar, a cylindrical casing or jacket, which is connected with it, and which nearly covers the upper half of the ball. Since the guiding bars in their turn are guided by the lateral guiding walls, the entire path of travel of the balls is practically closed. Surprisingly it has been found that the transverse carriage of a gas cutting device constructed according to this suggestion can not only travel with the least forces, but can also be rotated or rocked to a limited extent.

The transverse carriage is preferably guided relatively to the longitudinal carriage in such a way that the said rocking or turning movement is effected about the vertical central axis of the carriage. This transverse carriage-guiding means may consist of oppositely journaled rollers, one on each of its two longitudinal sides, which bear on corresponding race surfaces of the longitudinal carriage. For balance, the said roller bearings admit of being yieldingly arranged in a longitudinal direction.

Further features of the invention will now be described with reference to the accompanying drawings, in which.

Figure 1:
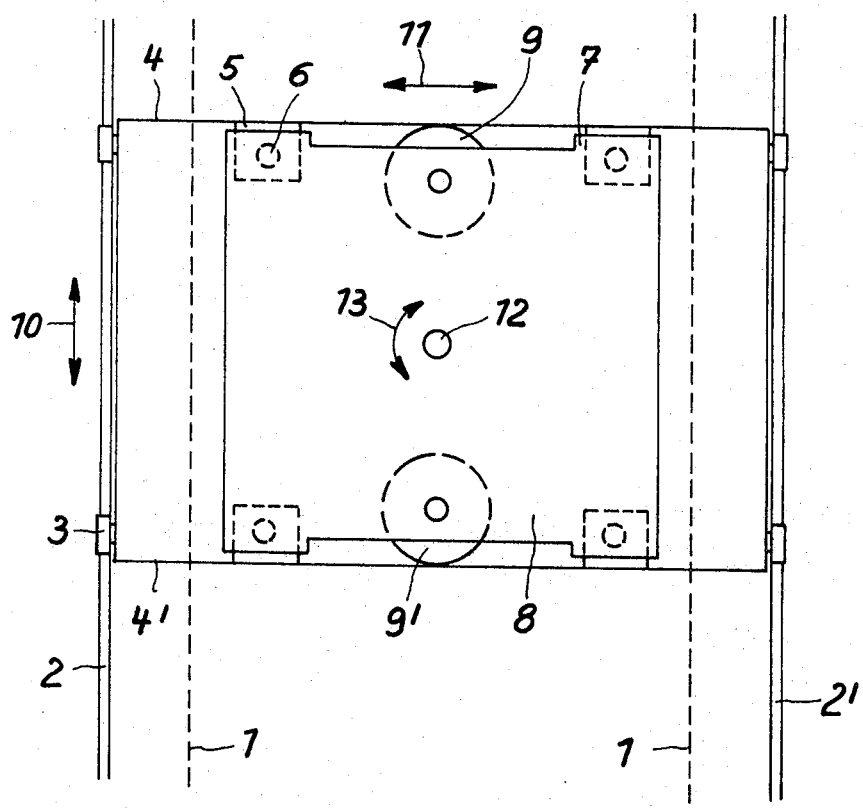
FIG. 1 shows a diagrammatic arrangement of one advantageous embodiment.

As FIG. 1 diagrammatically shows, there are located on both sides of a diagrammatically indicated longitudinal conveyor system 1, which may for instance be a supporting roller chain or the like, track rails 2 and 2' for the track rollers 3 of a longitudinal carriage. The transverse crossbars 4 and 4' of the longitudinal carriage are constructed with running surfaces or races 5 for balls 6.

The upper ball races are formed of appropriately shaped sections 7 of the transverse carriage 8. Furthermore there are journaled in the transverse carriage 8 guiding rollers 9 and 9', which bear on appropriately shaped bearing surfaces of the crossbars 4 and 4' respectively. As the diagrammatic representation quite clearly discloses, the new gas cutting device can adjust itself to any position of the continuous casting or like product to be severed. Whilst the longitudinal displacement in the direction of the arrow 10 is ensured by the track rollers 3, the balls 6 render possible both a transverse displacement in the direction of the arrow 11 and also a limited turning about the vertical central axis 12 of the transverse carriage in the direction of the arcuate arrow 13, the rollers 9 and 9' taking over the requisite guidance. For the sake of clearness, limiting abutments and the like are not illustrated.

While the method of working of the new gas cutting device can easily be gathered from the diagrammatic illustration in FIG. 1, FIG. 2 and FIGS. 3 and 4 illustrate details that are important for the constructional design.

The transverse carriage 8 carries bearing 14 and 14' for clamping levers 15 and 15' respectively. Both the clamping levers are provided with clamping jaws 16, which act on the strand material 17 to be severed. It is particularly advantageous to couple the clamping levers 15 to one another by means of a tension rod 18. This renders possible not only the joint actuation of the two clamping levers, by way of a cylinder 19 for example, the piston rod 20 of which is pivoted to the extension 21 of the clamping lever 15', but also the automatic adjustment of the transverse carriage to different positions of the strand material 17 in relation to the center of the conveyor device 1.

Figure 2:
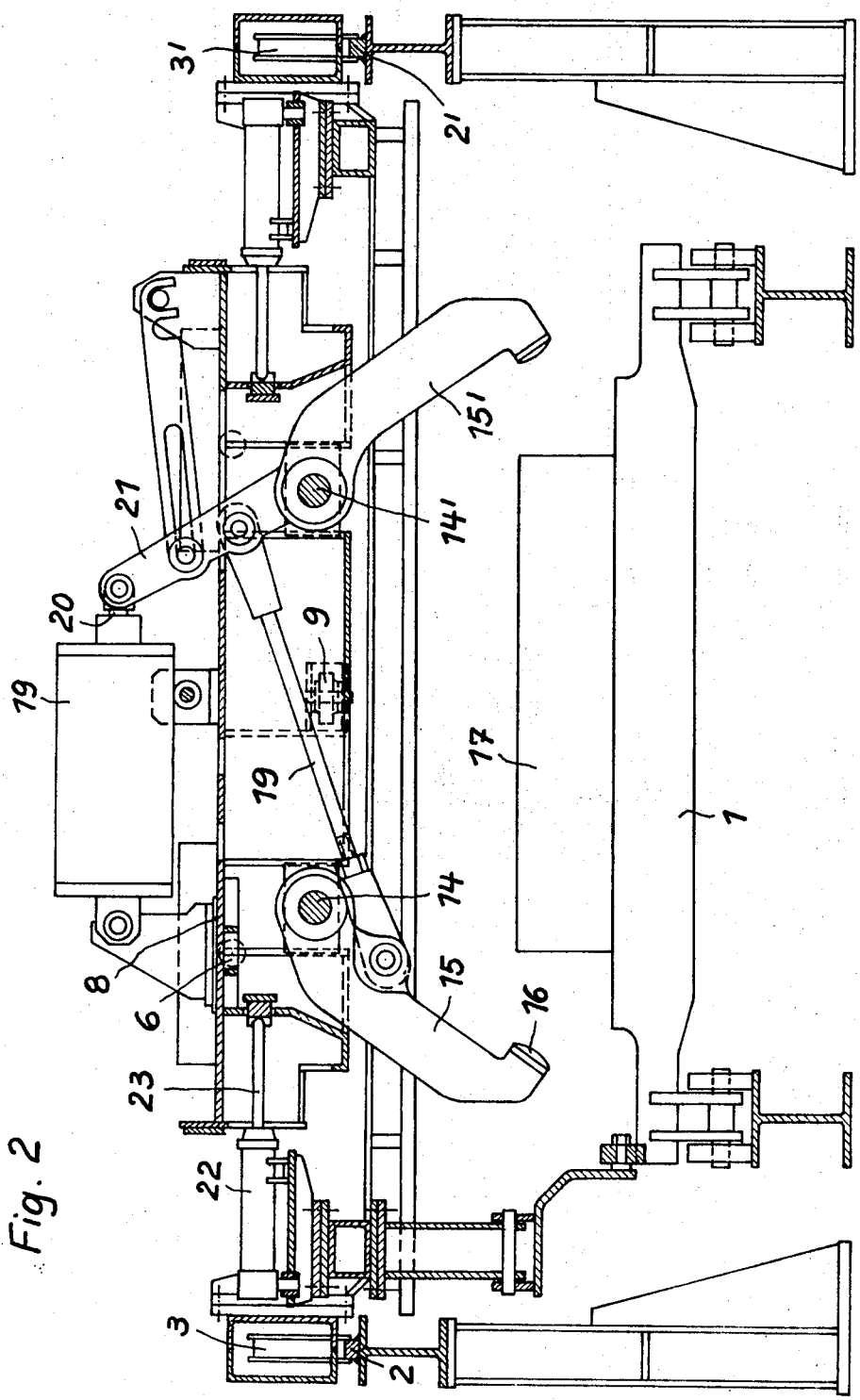
FIG. 2 shows a central section as seen in the direction of conveyance of the strand material, through a construction designed according to FIG. 1.

The balls 6 would not themselves be visible in this sectional FIG. 2, but their positions have been indicated approximately by dotted lines.

From the midposition outwards, the transverse carriage adjusts itself automatically in the manner already described, in that firstly one clamping jaw 16 comes into contact with the strand material, and then this jaw displaces the carriage in the transverse direction until the second clamping jaw engages it. When the clamping levers reopen, after a cut has been effected by means of the gas cutting device, which, for the sake of clearness, is not illustrated, only a slight additional force is needed to move the transverse carriage back into its mid position. For this purpose pressure means such as piston and cylinder units may be employed, the piston rods 23 being attached loosely to the transverse carriage 8, whilst displacement cylinders 22 are secured to the longitudinal carriage. These cylinders may be actuated with compressed air for example. It is particularly advantageous to connect both the displacement cylinders 22 permanently to the compressed-air network, so that the volume of air compressed into a cylinder during a transverse movement of the transverse carriage is forced back into the compressed-air piping system, until it can expand again after the opening of the clamping levers, taking the transverse carriage with it.

Figure 3:
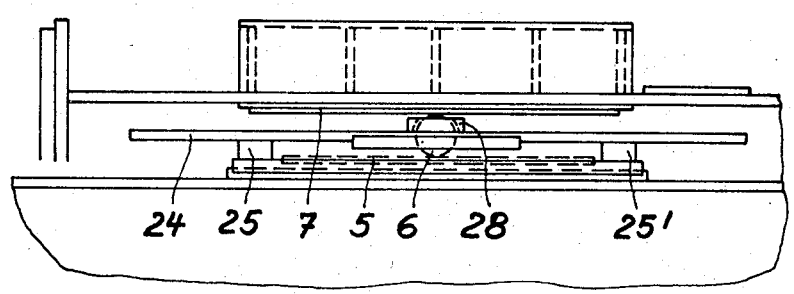
FIG. 3 shows a side view of the ball guide.
Figure 4:
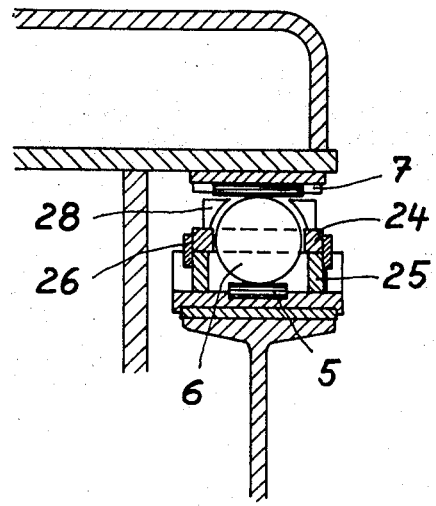
FIG. 4 shows in section a transverse view corresponding to FIG. 3.

As already described, the ball bearings, having regard to the existing operative conditions, need to be carefully designed. FIG. 3 shows the ball 6 located in a ball cage between its lower ball race 5 arranged on the crossbar of the longitudinal carriage, and its upper ball race 7 located on the transverse carriage. The ball cage consists essentially of the guiding bar 24, in the middle of which an aperture is provided for the ball 6. At the ends of the transverse ball race 5 of FIG. 3 are provided blocks 25 and 25', upon which the guiding bar is displaceable. Moreover the guiding bar 24, as FIG. 4 best shows, is also laterally guided by sidewalls 26. A cylindrical headpiece 28 which is mounted upon the guiding bars 24, serves to protect the ball 6. The upper ball race 7 is made comparatively wide, in comparison with the lower ball race 5, so as to permit the above-mentioned rotary movements. At the same time its wide construction also ensures that the opening of the cylinder 28 is broadly covered, so that no foreign bodies can penetrate into the ball guide.

The cylinders 22 are oscillatable, so that their piston rods are not subjected to any bending stress, but always exert only their maximum thrust.

The clamping-jaw lever 21 is pivoted to a positioning lever with a catch pawl, which limits the opening of the tongs.

I claim:

1. A gas cutting device for severing horizontally delivered material, comprising: a longitudinal carriage capable of travelling at the speed of delivery of the material to be severed on a track extending in the direction of delivery, a transverse carriage supported upon the longitudinal carriage, clamping levers for gripping the material to be severed and burners for cutting it, carried by the transversely movable carriage, crossbars forming part of the longitudinal carriage and extending over the track width of the longitudinal carriage, lower ball races on the longitudinal carriage, upper ball races on the underside of the transverse carriage; and bearing balls interposed between the lower and upper ball races, the upper and lower ball races differing from one another in width, and at least the wider ball races being plane.

2. A gas cutting device as claimed in claim 1, further comprising: ball cages, one for each of the said bearing balls, the ball cages being displaceable between the upper and lower ball races in the direction of movement of the material to be severed.

3. A gas cutting device as claimed in claim 2, wherein all the ball races are plane, and the upper ball races are wider than the lower ones, each ball cage consisting of a guide bar formed with a hole the diameter of which is equal to the diameter of the ball, and the device further comprising blocks arranged at both ends of the lower bearing races, the guide bars being displaceable upon the said blocks, and sidewalls laterally guiding the guide bars.

4. A gas cutting device as claimed in claim 3, further comprising a cylindrical casing mounted on each guide bar just above the hole containing the bearing ball, and substantially covering the upper half of the bearing ball.

5. A gas cutting device as claimed in claim 1, the transverse carriage being so mounted on the longitudinal carriage as to be capable of turning through a small angle relatively thereto about its central vertical axis.

6. A gas cutting device as claimed in claim 5, further comprising guiding rollers rotatable about vertical axes in opposite longitudinal sides of the transverse carriage, and bearing surfaces on the longitudinal carriage engaging the said guiding rollers.

7. A gas cutting device as claimed in claim 6, the engagement between the said guiding rollers and bearing surfaces being yieldable in the longitudinal direction.

8. A gas cutting device as claimed in claim 1, further comprising coupling means connecting the clamping levers with one another.

9. A gas cutting device as claimed in claim 8, further comprising pressure means freely engaging opposite sides of the transverse carriage and urging it into its midposition.